United States Patent
Kuang et al.

(10) Patent No.: US 9,207,415 B2
(45) Date of Patent: Dec. 8, 2015

(54) CABLE CONNECTOR ASSEMBLY WITH TWO PRINTED CIRCUIT BOARDS

(71) Applicant: HON HAI PRECISION INDUSTRY CO., LTD., New Taipei (TW)

(72) Inventors: Dong-Qi Kuang, Kunshan (CN); Ru-Yang Guo, Kunshan (CN); Qing-Man Zhu, Kunshan (CN); Jerry Wu, Irvine, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/284,678

(22) Filed: May 22, 2014

(65) Prior Publication Data

US 2014/0348470 A1 Nov. 27, 2014

(30) Foreign Application Priority Data

May 23, 2013 (CN) .......................... 2013 1 01919894

(51) Int. Cl.
  *G02B 6/36* (2006.01)
  *G02B 6/42* (2006.01)
  *G02B 6/44* (2006.01)

(52) U.S. Cl.
  CPC ............ *G02B 6/4281* (2013.01); *G02B 6/4284* (2013.01); *G02B 6/4416* (2013.01)

(58) Field of Classification Search
  CPC .......................... G02B 6/4281; G02B 6/4284
  USPC .......................................... 385/88, 89, 92, 93
  See application file for complete search history.

(56) References Cited

U.S. PATENT DOCUMENTS

| | | |
|---|---|---|
| 6,318,909 B1 | 11/2001 | Giboney et al. |
| 6,450,704 B1 | 9/2002 | O'Connor et al. |
| 6,798,955 B2 | 9/2004 | Kunkel et al. |
| 6,976,795 B2 | 12/2005 | Go et al. |
| 7,371,014 B2 | 5/2008 | Willis et al. |
| 7,401,985 B2 | 7/2008 | Aronson et al. |
| 7,876,989 B2 | 1/2011 | Aronson et al. |
| 2007/0053639 A1 | 3/2007 | Aruga |
| 2008/0025676 A1 | 1/2008 | Wang |
| 2010/0028017 A1* | 2/2010 | Mizoguchi .................... 398/141 |
| 2011/0123150 A1 | 5/2011 | Zbinden et al. |
| 2011/0262082 A1* | 10/2011 | Sakurai et al. .................. 385/89 |
| 2012/0195556 A1* | 8/2012 | Wang et al. ..................... 385/77 |
| 2013/0279862 A1 | 10/2013 | Ishii et al. |

FOREIGN PATENT DOCUMENTS

CN 101876731 11/2010

\* cited by examiner

*Primary Examiner* — Ryan Lepisto
(74) *Attorney, Agent, or Firm* — Ming Chieh Chang; Wei Te Chung

(57) ABSTRACT

A cable connector assembly includes a connector and a cable electrically connected with the connector. The connector includes a shell, a first and a second printed circuit boards received in the shell, and an opto-electronic conversion module, the second printed circuit board including a first end electrically connected with the first printed circuit board and a second end opposite to the first end, the second end comprising a first connecting portion electrically connected with the opto-electronic conversion module and a second connecting portion. The cable includes a number of electrical wires electrically connected with the second connecting portion for transmitting electrical signal and a number of optical fibers or wires coupling with the opto-electronic conversion module for transmitting optical signal.

20 Claims, 6 Drawing Sheets

CABLE CONNECTOR ASSEMBLY WITH TWO PRINTED CIRCUIT BOARDS

BACKGROUND OF THE INVENTION

1. Field of the Invention

The present invention generally relates to a cable connector assembly, and more particularly to arrangement between its opto-electronic conversion module and two printed circuit boards.

2. Description of Related Art

U.S. Pat. No. 7,401,985 discloses an electrical-optical active optical cable comprising a printed circuit board, an opto-electronic conversion module on the printed circuit board, an integrated electrical connector or mating portion on an end of the printed circuit board for mating with a complementary electrical connector, and a cable with optical wires and electrical wires permanently coupled at the other end of the printed circuit board to the opto-electronic conversion module. The electrical wires and the optical wires are supposed to be disposed either at the same side or different sides of the printed circuit board, though it is not detailed.

U.S. Pat. No. 6,318,909 discloses an optical assembly comprising a printed circuit board and an optical communication device. The optical communication device comprises an array of electro-optical elements such as lasers and photodiodes capable of transmitting or receiving optical signals. The optical communication device is electrically connected to one or more of the conductive tracks on the printed circuit board. The optical communication device may transmit one or more optical signals in response to respective electrical signals received via the printed circuit board, or may transfer one or more electrical signals to the printed circuit board in response to corresponding optical signals. When transmitting, the optical communications device receives electrical signals from the printed circuit board, converts the electrical signals into respective optical signals, and transmits the optical signals to the optical fibers. When receiving, the optical communications device receives optical signals from the optical fibers, converts the optical signals into electrical signals, and transmits the electrical signals to the printed circuit board.

Correspondingly, an improved cable connector assembly is desired to offer advantages over the related art.

BRIEF SUMMARY OF THE INVENTION

Accordingly, an object of the present invention is to provide a cable connector assembly having an easy production process.

In order to achieve the above-mentioned object, a cable connector assembly in accordance with the present invention comprises a connector and a cable electrically connected with the connector. The connector comprises a shell, a first and a second printed circuit boards received in the shell and an opto-electronic conversion module, the second printed circuit board including a first end electrically connected with the first printed circuit board and a second end opposite to the first end, the second end comprising a first connecting portion electrically connected with the opto-electronic conversion module and a second connecting portion. The cable comprises a plurality of electrical wires electrically connected with the second connecting portion for transmitting electrical signal and a plurality of optical wires coupling with the opto-electronic conversion module for transmitting optical signal.

Other objects, advantages and novel features of the invention will become more apparent from the following detailed description of the present embodiment when taken in conjunction with the accompanying drawings.

DETAILED DESCRIPTION OF THE INVENTION

Figure 1:
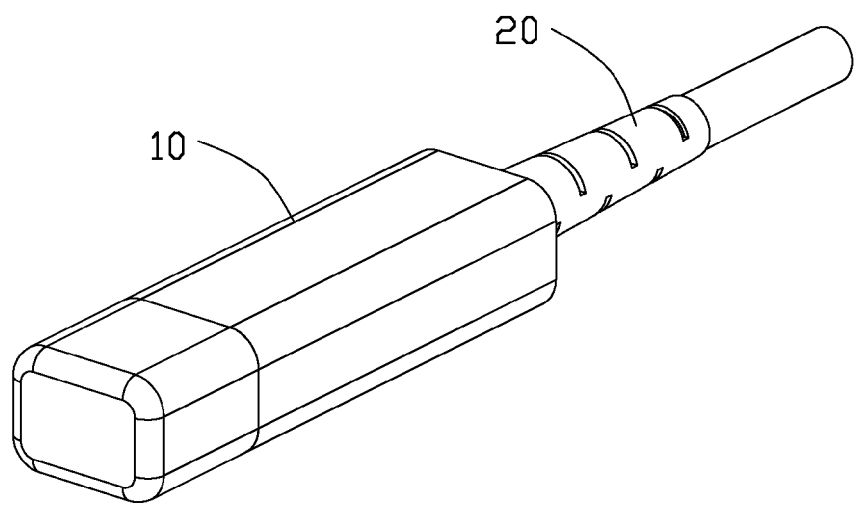
FIG. 1 is a perspective view of a cable connector assembly in accordance with the present invention, wherein a cover is mounted on a front end of the cable connector assembly.

Reference will now be made to the drawing figures to describe the present invention in detail.

Figure 2:
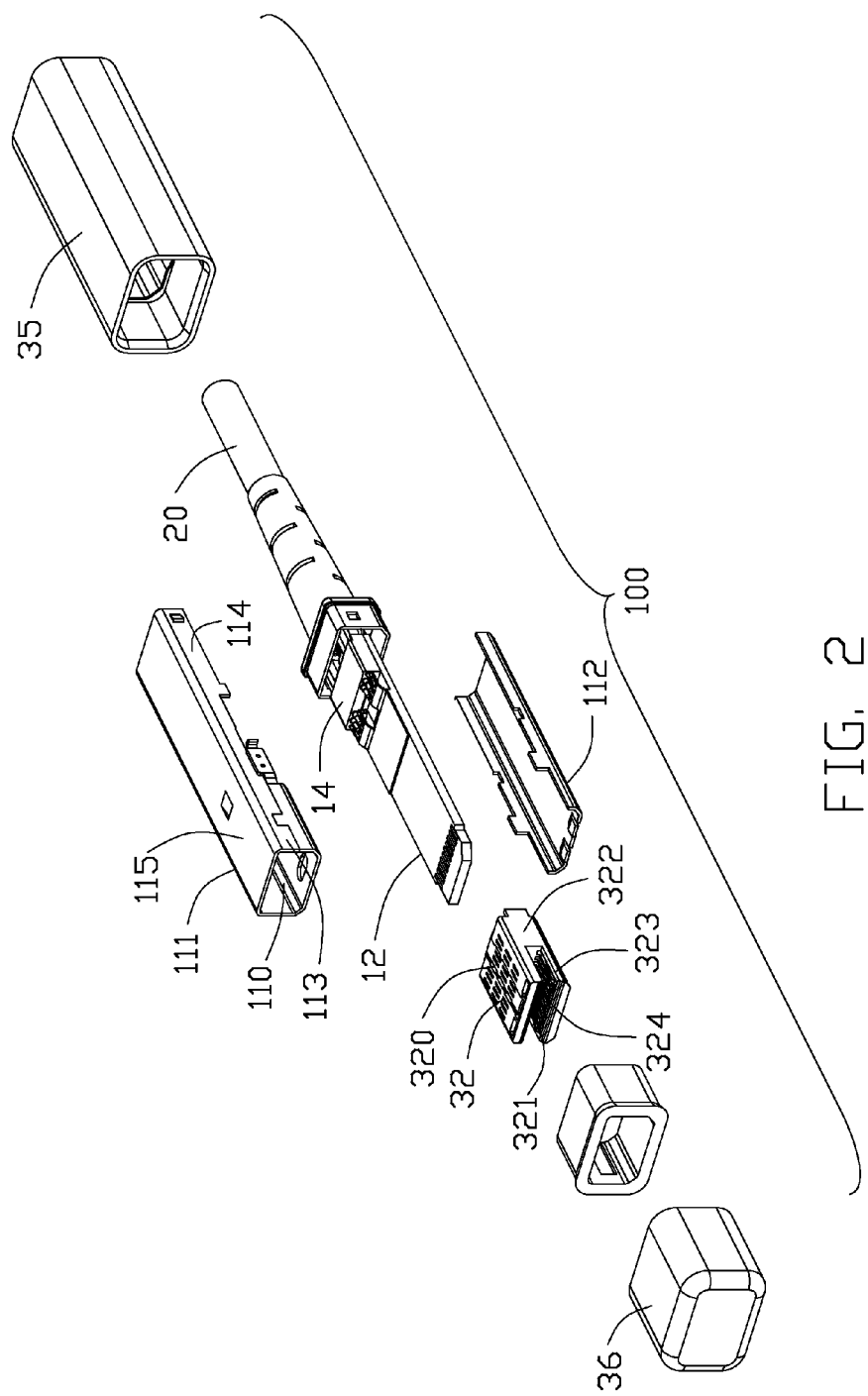
FIG. 2 is an exploded view of the cable connector assembly as shown in FIG. 1.
Figure 3:
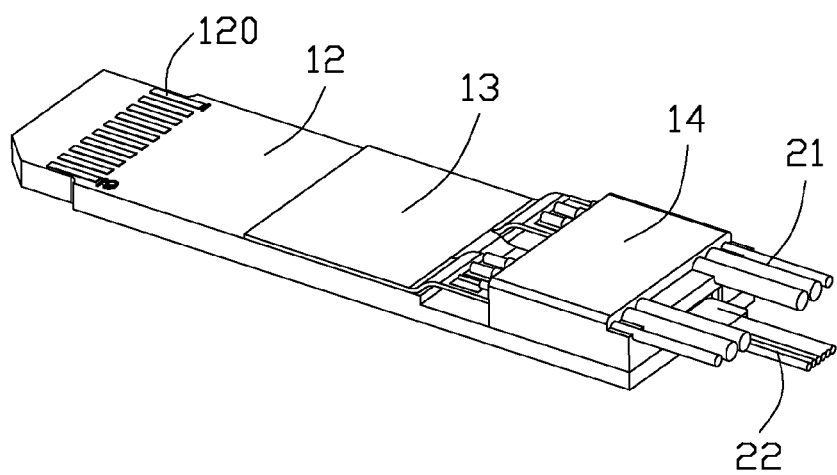
FIG. 3 is a view of partially components of the cable connector assembly.
Figure 4:
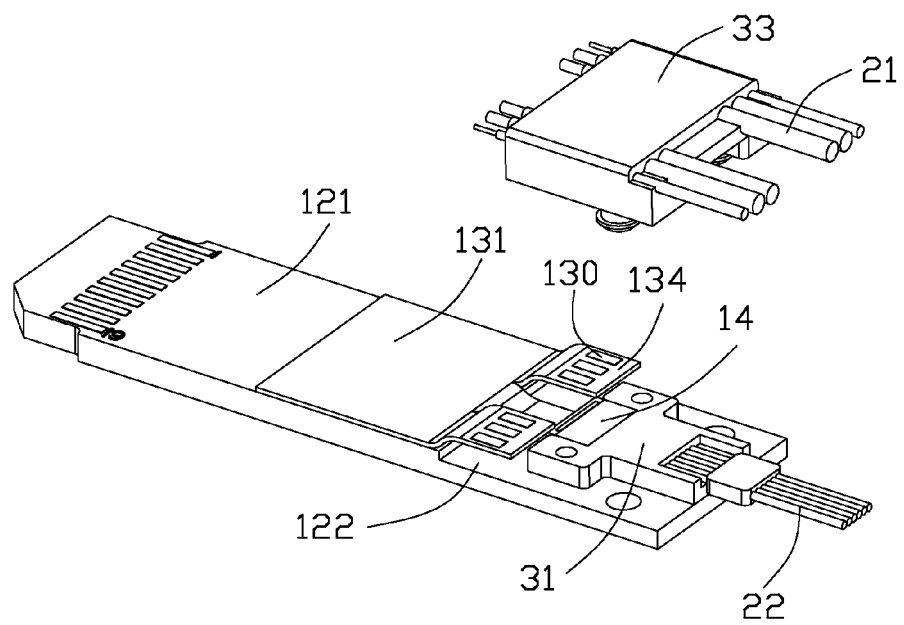
FIG. 4 is a partially exploded view of partially components of the cable connector assembly as shown in FIG. 3.
Figure 5:
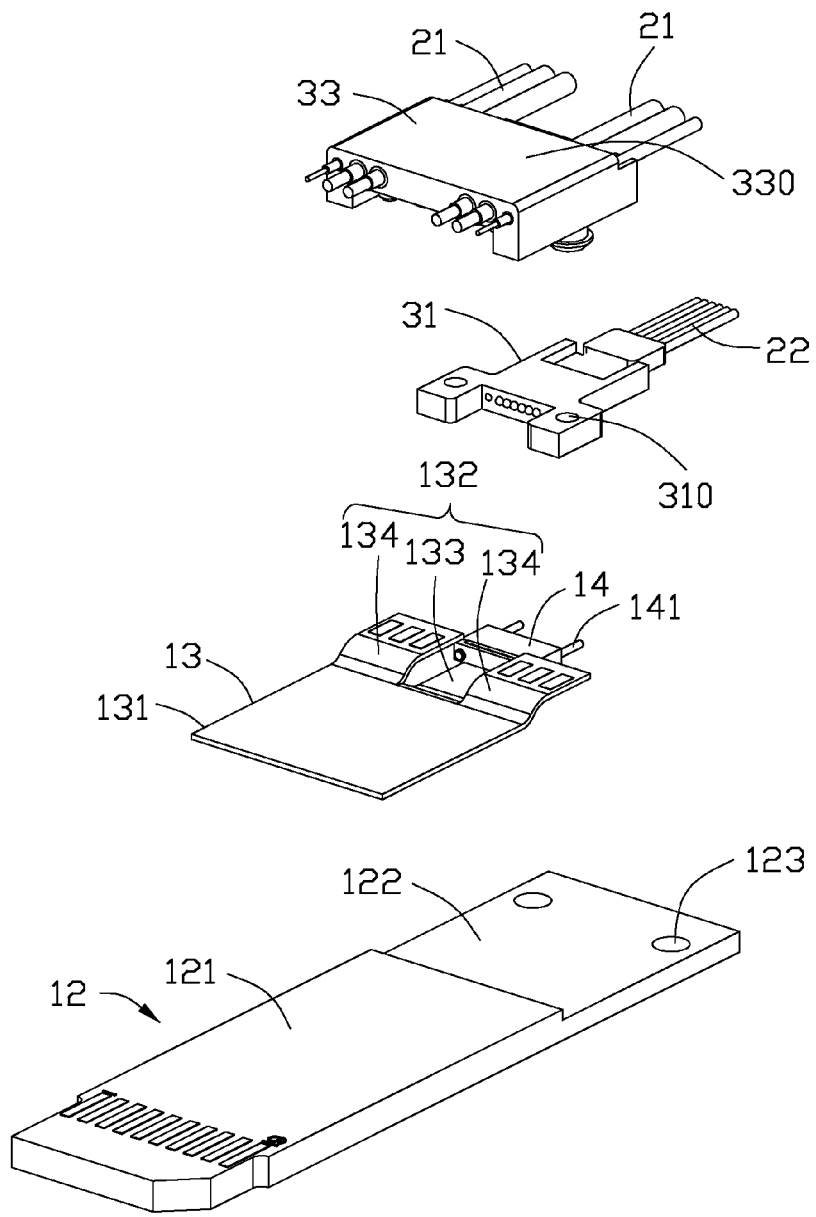
FIG. 5 is an exploded view of partially components of the cable connector assembly as shown in FIG. 4.
Figure 6:
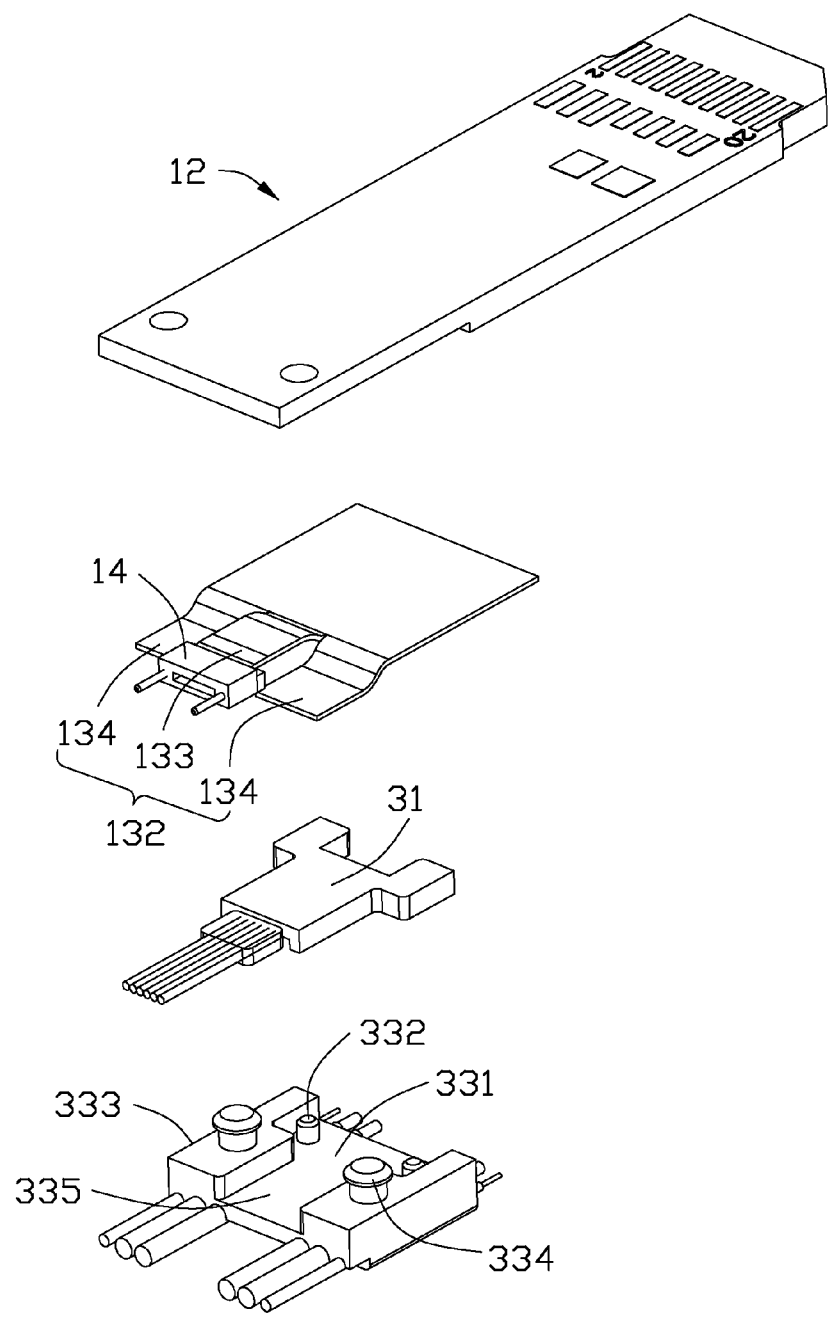
FIG. 6 is a view similar to FIG. 5, but from another perspective.

Referring to FIGS. 1-6, a cable connector assembly 100 in accordance with the present invention comprises a connector 10 and a cable 20 comprising a plurality of electrical wires 21 and optical wires 22 for transmitting signal and coupling with the connector 10. The connector 10 comprises a shell (not labeled), a first and a second printed circuit boards 12, 13 received in the shell, an opto-electronic conversion module 14, a ferrule 31 disposed at a front end of the optical wires 21, a mating portion 32 mounted on a front end of the first printed circuit board 12 for engaging with a complementary connector (not shown), an insulator used for positioning the electrical wires 21, a cover 35 mounted on an outside of the shell and a cap 36 coupling with the mating portion 32.

The first printed circuit board 12 comprises a base portion 121 electrically connected with the second printed circuit board 13 and a supporting portion 122 having a thickness smaller than a thickness of the base portion 121. An upper surface of the base portion 121 is higher than an upper surface of the supporting portion 122. A low surface of the base portion 121 and a low surface of the supporting portion 122 are located on a same level. A plurality of conductive pads 120 are formed on the upper and low surfaces of the base portion 121. A pair of holes 123 are formed on the supporting portion 122.

The second printed circuit board 13 comprises a first end 131 having a flat-shape, a second end 132 opposite to the first end 131. A width of the second printed circuit board 13 is equal to a width of the first printed circuit board 12. The first end 131 of the second printed board 13 is at least partially electrically connected with the base portion 121 of the first printed circuit board 12 and disposed parallel to the first printed circuit board 12. The second end 132 of the second printed circuit board 13 comprises a pair of first connecting portions 134 spaced apart from each other and a second connecting portion 133 disposed between the pair of first connecting portions 134. The first connecting portion 133 bends downwardly and extending backwardly from an end of the first end 131. The second connecting portion 134 bends upwardly and extending backwardly from the end of the first end 131. A vertical distance between the first connecting portion 133 and the supporting portion 122 is less than a vertical distance between the second connecting portion 134 and the supporting portion 122. Both the first connecting portion 133 and the second connecting portion 134 are disposed at the same side of the second printed circuit board 13 and located above the supporting portion 122. In this embodiment, it is beneficial to reduce the overall height of the cable connector assembly 100 and improve production efficiency. And the second printed circuit board 13 is a flexible board. Plural soldering pieces 130 are disposed on a surface of the second connecting portion 134. The electrical wires 21 are electrically connected with corresponding soldering pieces 130 by surface mounted technology.

The opto-electronic conversion module 14 is electrically connected with an end of the first connecting portion 133 and pressed against the supporting portion 122. The opto-electronic conversion module 14 is designed into rectangle, and comprising lasers (not shown) and photodiodes (not shown) capable of transmitting or receiving optical signals, and plural protrusions 141 extending from a rear surface for coupling with the ferrule 31. The opto-electronic conversion module 14 is electrically connected to one or more of the conductive tracks on the second printed circuit board 13. The opto-electronic conversion module 14 may transmit one or more optical signals in response to respective electrical signals received via the first and second printed circuit boards 12, 13. When transmitting, the opto-electronic conversion module 14 receives electrical signals from the second printed circuit board 13, converts the electrical signals into respective optical signals, and transmits the optical signals to the optical wires 22. When receiving, the opto-electronic conversion module 14 receives optical signals from the optical wires 22, converts the optical signals into electrical signals, and transmits the electrical signals to the second printed circuit board 13.

The ferrule 31 is connected with the optical wires 22 and coupling with the opto-electronic conversion module 14 in the horizontal direction. In this embodiment, the optical signal is transmitted in one direction for reducing the loss of the optical signal. A front end of the ferrule 31 comprises a lens array (not labeled). A pair of mounting holes 310 are disposed on a surface of the ferrule. The optical signal is focused by the lens array, and then directly entered the opto-electronic conversion module 14. Comparing to the traditional art that the optical signal transmission needs to be refracted 90 degrees, it is easy production process and reduce the loss of the optical signal.

The insulator 33 comprises a first planar surface 330, a second surface 331 opposite to the first planar surface 330 and toward the supporting portion 122, a pair of posts 332 exposed on the second surface and engaging with corresponding mounting hole 310 of the ferrule 31, and a pair of flanges 333 extending outwardly from two lateral sides of the second surface 331 of the insulator 33, and a pair of connecting mechanism 334 extends outwardly from corresponding flange 333 and coupling with corresponding hole 123 for retaining the insulator 33. A T-shaped recess 335 is formed between the pair of flanges 333 and used to receive the ferrule 31. The electrical wires 21 are retained in the insulator 33. The electrical wires 21 and the optical wires 22 are located on different level after installation. It is beneficial to separate the electrical wires 21 and the optical wires 22, and it is convenient to make the electrical wires 21 connected with the second connecting portion 134.

The mating portion 32 comprises an insulative housing 320, a plurality of conductive terminals 321 arranged in two rows received in the insulative housing 320. The insulative housing 320 comprises a main portion 322, a pair of tongues 323 extending forwardly from the main portion 322, a receiving space 324 disposed between the pair of tongues 323. The conductive terminals 321 are electrically connected with the conductive pads 120 of the base portion 121 of the first printed circuit board 12.

The shell is made of metallic material and comprising a top shell 111 and a bottom shell 112 assembled to each other along a direction perpendicular to a mating direction. The top shell 111 comprises a frame-shaped base portion 113 and a U-shaped extension portion 114 extending backwardly from the base portion 113 thereof. The base portion 113 of the top shell 111 has a cavity 110 and a top wall 115. The top wall 115 and an upper wall of the extension portion 114 are located on a same level.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector assembly comprising:
a connector comprising a shell, a first printed circuit board and a second printed circuit board received in the shell, and an opto-electronic conversion module, the second printed circuit board including a first end electrically connected with the first printed circuit board and a second end opposite to the first end, the second end comprising a first connecting portion electrically connected with the opto-electronic conversion module and a second connecting portion;
a cable comprising a plurality of electrical wires electrically connected with the second connecting portion for transmitting electrical signal and a plurality of optical wires coupling with the opto-electronic conversion module for transmitting optical signal;
wherein the second printed circuit board is a flexible board, and the second connecting portion is soldered with the electrical wires.

2. The cable connector assembly as claimed in claim 1, wherein the first printed circuit board comprises a base portion connected with the second printed circuit board and a supporting portion having a thickness smaller than a thickness of the base portion, a vertical distance between the first connecting portion and the supporting portion being less than a vertical distance between the second connecting portion and the supporting portion.

3. The cable connector assembly as claimed in claim 1, further comprising a ferrule disposed at a front of the optical wires, the ferrule engaged with the opto-electronic conversion module.

4. The cable connector assembly as claimed in claim 3, further comprising an insulator for positioning the electrical wires.

5. The cable connector assembly as claimed in claim 4, wherein the insulator is mounted on the supporting portion and the ferrule is located between the insulator and the supporting portion.

6. The cable connector assembly as claimed in claim 3, wherein a front end of the ferrule comprises a lens array, the optical signal being focused by the lens array and then being transmitted to the opto-electronic conversion module.

7. The cable connector assembly as claimed in claim 1, wherein the second printed circuit board comprises a pair of second connecting portions spaced apart from each other, the first connecting portion disposed between the pair of second connecting portions.

8. The cable connector assembly as claimed in claim 1, wherein the first connecting portion is bent downwardly and extends backwardly from the first end, and the second connecting portion is bent upwardly and extends backwardly from an end of the first end.

9. A cable connector assembly comprising:
   an insulative housing defining a mating portion;
   a plurality of contacts disposed in the housing with contacting sections exposed in the mating portion;
   a hard printed circuit board located behind the housing;
   a cable located essentially behind the hard printed circuit board and including a plurality of electrical wires and a plurality of optical fibers;
   said hard printed circuit board defining, along a front-to-back direction, a front end region to which the contacts are mechanically and electrically connected, and a rear end region around which the electrical wires are electrically connected and the optical fibers are optically connected via an opto-electronic conversion module and a flexible printed circuit board; wherein
   said flexible printed circuit board is electrically connected to the hard printed circuit board, and said flexible printed circuit board and the opto-electronic conversion module are connected to each other in a perpendicular manner.

10. The cable connector assembly as claimed in claim 9, wherein the electrical wires are mechanically and electrically connected to the flexible printed circuit board around the rear end region of the hard printed circuit board.

11. The cable connector assembly as claimed in claim 10, wherein said flexible printed circuit board is split into two sections at two different levels, and one section is for electrical connection with the electrical wires while the other section is for optical connection with opto-electronic conversion module.

12. The cable connector assembly as claimed in claim 11, wherein the electrical wires are farther from the hard printed circuit board than the optical fibers from the hard printed circuit board.

13. The cable connector assembly as claimed in claim 11, further including an insulator to align the electrical wires to the flexible printed circuit board, and a ferrule to align the optical fibers to the opto-electronic conversion module.

14. The cable connector assembly as claimed in claim 13, wherein both the ferrule and the insulator are directly mounted upon the rear end region of the hard printed circuit board.

15. The cable connector assembly as claimed in claim 11, wherein a connection located between the flexible printed circuit board and the opto-electronic conversion module is located behind that between the flexible printed circuit board and the electrical wires in said front-to-back direction.

16. The cable connector assembly as claimed in claim 9, wherein said flexible printed circuit board is directly mechanically connected to the hard printed circuit board.

17. The cable connector assembly as claimed in claim 9, wherein the electrical wires are located by two sides of the optical fibers.

18. A cable connector assembly comprising:
    a connector comprising a shell, a first printed circuit board and a second printed circuit board received in the shell, and an opto-electronic conversion module, the second printed circuit board including a first end electrically connected with the first printed circuit board and a second end opposite to the first end, the second end comprising a first connecting portion electrically connected with the opto-electronic conversion module and a second connecting portion;
    a cable comprising a plurality of electrical wires electrically connected with the second connecting portion for transmitting electrical signal and a plurality of optical wires coupling with the opto-electronic conversion module for transmitting optical signal;
    a ferrule disposed at a front of the optical wires, the ferrule engaged with the opto-electronic conversion module; and
    an insulator positioning the electrical wires, the insulator being mounted on the supporting portion and receiving the ferrule, the ferrule located between the insulator and the supporting portion.

19. The cable connector assembly as claimed in claim 18, wherein the second printed circuit board comprises a pair of second connecting portions spaced apart from each other, the first connecting portion disposed between the pair of second connecting portions.

20. The cable connector assembly as claimed in claim 18, wherein the second printed circuit board is a flexible board, and the second connecting portion is soldered with the electrical wires.

\* \* \* \* \*